United States Patent [19]

Hutchins

[11] 4,373,258

[45] Feb. 15, 1983

[54] TOOL FOR REMOVING COVER FROM ELECTRICAL CONNECTOR

[75] Inventor: Erle M. Hutchins, Bel Air, Md.

[73] Assignee: Western Electric Company, Incorporated, New York, N.Y.

[21] Appl. No.: 247,662

[22] Filed: Mar. 26, 1981

[51] Int. Cl.³ .................... B23P 19/00; H01R 43/00

[52] U.S. Cl. .................... 29/764; 29/235; 29/426.6

[58] Field of Search .............. 29/764, 762, 235, 426.6

[56] References Cited

U.S. PATENT DOCUMENTS

| | | | |
|---|---|---|---|
| 3,422,521 | 1/1969 | Beinhaur | 29/764 |
| 3,909,899 | 10/1975 | Witt | 29/764 |
| 3,909,904 | 10/1975 | Strunk | 29/229 |
| 4,207,665 | 6/1980 | Kuvek | 29/764 X |

FOREIGN PATENT DOCUMENTS

| | | | |
|---|---|---|---|
| 2912422 | 10/1980 | Fed. Rep. of Germany | 29/764 |

*Primary Examiner*—Carl E. Hall

*Attorney, Agent, or Firm*—E. W. Somers

[57] ABSTRACT

A telephone station adapter includes a well-known ribbon-type connector having a modular jack at one end and supported from a hood which covers the connector and the jack. Because of testing procedures and because of the need to rearrange connections of conductors to contact elements of the ribbon-type connector, it becomes necessary to remove the hood without damaging it. This is accomplished with the tool of this invention in which the connector is supported in such a way that relative motion may be caused between it and a hood-removal portion of the tool. The hood-removal portion of the tool includes a portion which cams apart end sidewalls of the hood to disengage detents thereof from a body of the connector. The tool also includes a separating portion which causes the hood to be moved away from the connector once it has been disengaged and a prong which is moved into a cavity of the jack to hold the connector in engagement with a supporting surface while the hood is being removed.

11 Claims, 10 Drawing Figures

TOOL FOR REMOVING COVER FROM ELECTRICAL CONNECTOR

TECHNICAL FIELD

This invention relates to a tool for removing a cover from an electrical connector. More particularly, it relates to a tool which is used to remove a cover from a connector assembly which comprises a modular jack and a ribbon-type connector to facilitate repair and/or rearrangement of electrical connections.

BACKGROUND OF THE INVENTION

In a well-known interconnection technique, a cable is extended from telephone signaling and switching equipment to telephone station equipment such as telephone units by a pair of mating connectors. See, for example, U.S. Pat. Nos. 4,113,179, 4,113,337 and 4,214,803 for a description of such connectors. These kinds of connectors are often referred to as ribbon-type connectors. Each of the connectors includes a plurality of contact elements with one end of each being connected to a conductor and the other end being engageable by a contact element of a mateable connector. A hood is assembled to a connector body to enclose the connections. In this manner, a number of circuits can be extended from a connector which is connected through a mateable connector to the telephone signaling and switching equipment.

Modularization of telephone interconnection systems has become increasingly popular in order to reduce hardware requirements and the service expense inherent in performing individual conductor terminations. This trend towards modularity is discussed by Albin R. Meier, in his article "The modular telephone—a money-saving idea whose time has come", *Telephone*, Nov. 25, 1974, pp. 27–33.

Modularity includes the use of modular plugs and jacks such as those disclosed in U.S. Pat. No. 3,699,498 which issued on Oct. 17, 1972 in the names of E. C. Hardesty et al and U.S. Pat. No. 3,990,764 which issued on Nov. 9, 1976 in the name of C. L. Krumreich. Modular jacks are presently being incorporated into individual telephone units, and modular plugs are used for terminating both ends of telephone cords. The interconnection between the cord and the telephone unit is then effected by the mating of a modular plug and jack. In addition, a variety of junction boxes, adapters and other devices have been developed which incorporate modular jacks for receiving such plugs.

In telephone interconnection systems, individual telephones are required to have one or more specific features according to customer requirements, such as preselected telephone numbers, multiple-lines, or a hold button, for example. The individual telephones must be connected to the system so as to accommodate these requirements. Also, these customer requirements may change after a period of time, necessitating a service call to rearrange the connections. Both installation and subsequent rearrangements have required a tedious connection and reconnection of conductors to contact elements according to the original or modified requirements.

In a recently introduced system for providing for such service requirements, only selected ones of the circuits from the switching equipment are extended from the mateable connector to the connector associated with a telephone station. This is accomplished by simply providing the latter connector with less than a full complement of contact elements at selected positions. A connector for effecting such selective service includes a ribbon-type connector having a modular jack assembled thereto and is commonly referred to as an adapter. Plural conductors electrically interconnect electrical contact elements of the modular jack with preselected ones of the contact elements in the ribbon-type connector which supports the jack, thereby electrically connecting the telephone unit with the desired signal outputs of the telephone switching equipment system. Service to the telephone unit is charged by rearranging the connection of the conductors from the jack to contact elements of the ribbon-type connector of the adapter.

One problem which arises when connections are to be rearranged relates to the removal of the hood which encloses the contacts of each mateable connector. The hood, which in these kinds of adapters is made of plastic, is also used to support a modular jack at one end of the connector. The hood also includes sidewalls having portions which cooperate with portions of the connector body to secure the hood to the body. In order to disassemble this kind of connector to rearrange the connections, the depending portions of sidewalls of the hood must be spread apart in a careful manner to avoid damaging the plastic hood.

Not only is the capability of hood removal important in the field to facilitate connection rearrangements, but also in the factory for repair purposes. Unfortunately, the ribbon-type connector modular jack adapter is more easily tested electrically when the hood is in position on the body. In those cases of defective connectors, the hoods must be removed without damage.

From all appearances, the prior art does not offer an adequate solution to this problem. Hood removal tools for ribbon-type connectors are available, such as for example a plier arrangement in which the gripping of the handles causes opposite ends to be moved apart against the depending portions of the hood. But in use of the just-described tool, an installer must use one hand to hold the connector and another hand to operate the tool. Then the hand used to hold the connector must somehow be manipulated to remove the hood while the other hand holds the tool in its operated position.

While hand tools are available for removing hoods from ribbon-type connectors, the marketplace does not appear to offer one for use with the above-described adapter. Clearly, there appears to be a need for a hand tool which is inexpensive to manufacture and which is easily used in the field as well as in the factory to remove a plastic hood from a ribbon-type connector adapter.

SUMMARY OF THE INVENTION

The foregoing problems are overcome by a tool of this invention which is used to disassemble a cover from secured engagement with depending sidewalls of a connector and from engagement with a modular jack that is supported at one end of the connector. For moving the cover from its assembled relation with at least the one end of the connector and from engagement with the modular jack, the tool includes a prong, camming means and separating means. The prong is adapted to be inserted into a cavity of the jack of a connector. The camming means, which is aligned with one end of the connector when the prong is inserted into the cavity of the jack, is responsive to engagement with one end of the connector for spreading apart the depending portions of the cover to disengage the depending portions of the sidewalls from the connector. Rendered effective by the spreading of the sidewalls is the separating means which causes the cover to be moved away from the connector.

The tool may also include support means which includes facilities for holding the connector. The support means is effective to permit relative motion between hood removal means, which includes the prong, the camming means and the separating means, and the connector on the support means. The relative motion causes the prong to enter the cavity of the jack while the camming means, which include camming surfaces, spreads apart the depending portions of the sidewalls of the cover. This allows the separating means which may be a second camming means or a pivotally mounted bifurcated beam to be rendered effective to be operated to cause the cover to be moved away from the connector and the jack.

BRIEF DESCRIPTION OF THE DRAWINGS

Other features of the present invention will be more readily understood from the following detailed description of specific embodiments thereof when read in conjunction with the accompanying drawings, in which.

DETAILED DESCRIPTION

Figure 1:
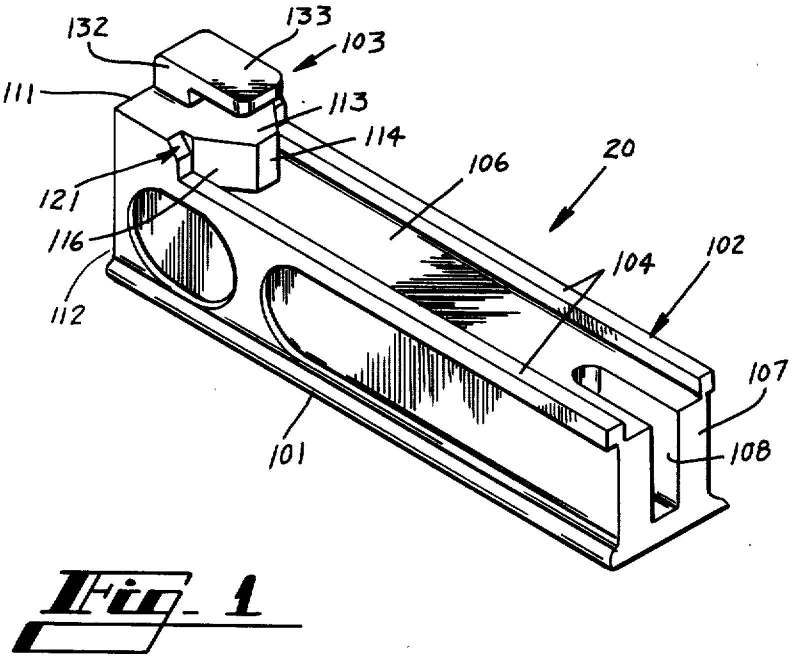
FIG. 1 is a perspective view of a tool of this invention for removing a cover from a connector.
Figure 2:
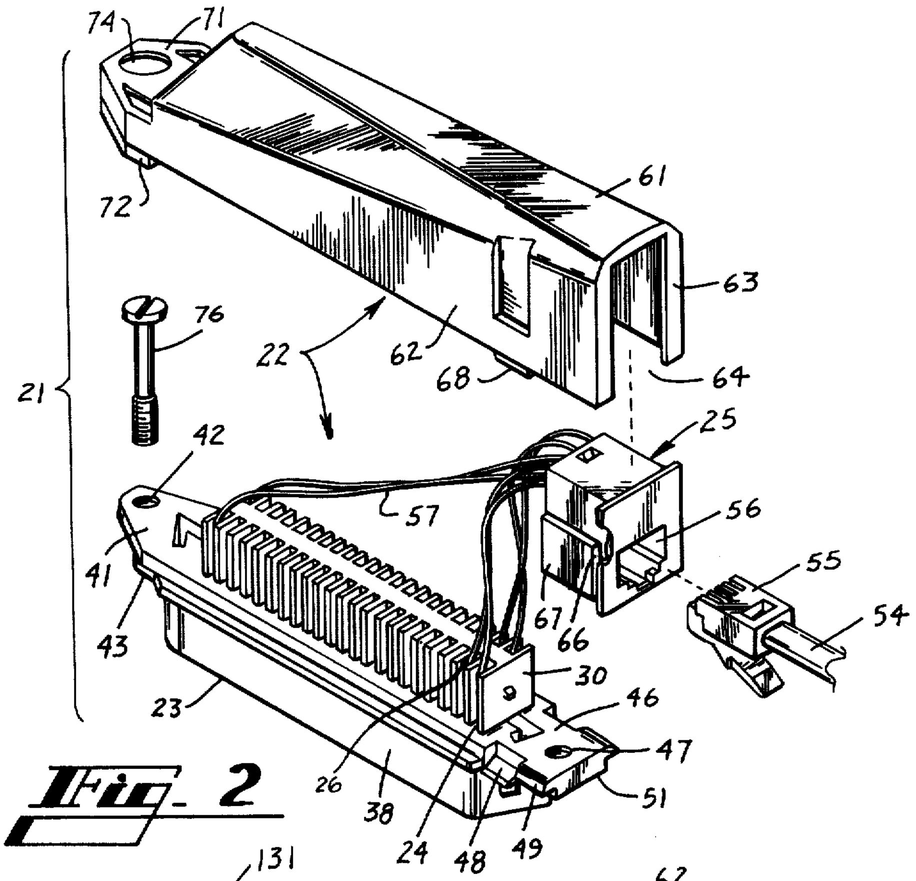
FIG. 2 is a perspective exploded view of a connector and jack assembly from which a cover is removed with the tool of this invention.

Referring now to FIG. 1, there is shown a tool, which is designated generally by the numeral 20, for removing a cover from an electrical connector 21 which includes a ribbon-type connector 22 and a modular jack 25 and which is shown in FIG. 2. The ribbon-type connector 22 includes a body 23 which is made of a dielectric material, is well-known in the industry and is shown for example in priorly mentioned U.S. Pat. Nos. 4,214,803, 4,113,179 and 4,113,337, each of which is incorporated by reference hereinto.

The ribbon-type connector 22 is elongate and comprises the dielectric body 23 having a plurality of spaced barriers 30—30 which define channels 24—24 for receiving individual contacts (not shown). Each of the contacts is metallic and includes one portion which engages with a corresponding contact of a complementary connector while another portion is electrically connected, such as by soldering, crimping or insulation piercing techniques to an individual conductor of a cable which is terminated by the ribbon-type connector 22.

The dielectric body 23 includes a cavity with which the channels 24—24 communicate. The cavity has uninterrupted inner sidewalls with apertures formed between each inner wall and an associated external sidewall 38. The contact elements are mounted within the body 23 so that the one portion of each is disposed in a channel and so that the other portion of each extends along an inner wall and is then turned into an aperture. The connector 21 which is depicted in FIG. 2 is adapted to have a complementary connector received in its cavity such that contact elements of the complementary connector engage those of the connector 21.

The connector body 23 is formed to have a front end flange 41. The flange 41 includes at least a partially threaded aperture 42 and has undercut edge portions 43—43. At the other end of the elongate body 23, a flange 46 is formed. That flange also includes at least a partially threaded aperture 47, a ledge 48 on each side of the flange and an overhang 49 between each ledge and an end 51 of the body 23.

A telephone connection arrangement for connecting telephone switching equipment to a telephone station includes a cable having a plurality of conductors (not shown) which are individually connected to points of the switching equipment. The other ends of the conductors are connected to individual contact elements of a connector (not shown) which is mateable with the connector 21. The connection from the connector 21 to the telephone station equipment is made along a cord 54 which is comprised of fewer conductors than the cable.

In order to connect the conductors of the cord 54 to appropriate ones of the conductors of the cable, the cord is terminated with a modular plug 55 such as that shown in U.S. Pat. No. 4,148,539 which issued on Apr. 10, 1979. The plug is adapted to be received in a cavity 56 of the modular jack 25. The modular jack 25 may be one such as that shown in U.S. Pat. No. 3,990,764 which issued on Nov. 9, 1976 to C. L. Krumreich. Both U.S. Pat. Nos. 4,148,539 and 3,990,764 are incorporated by reference hereinto. The modular jack 25 comprises a plurality of wire-like contact elements which are engaged by terminals of a modular plug which is inserted into its cavity. Other ends of the contact elements of the jack 25 are connected to insulated conductors 57—57 which are routed to and connected to appropriate ones of the contact elements of the ribbon-type connector 22.

This arrangement of a ribbon-type connector 22 and a jack 25, which is referred to as an adapter, saves costs in that the connector 21 need only be made to include a number of contact elements which are required to terminate the conductors of the jack. For a disclosure of one manufacturer's product of this kind of arrangement, see U.S. Pat. Nos. 4,070,548, 4,239,317 and 4,239,320.

Figure 3:
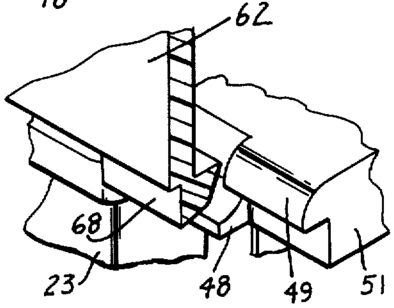
FIG. 3 is an enlarged view of a portion of the connector of FIG. 2 showing a latching arrangement of the cover to the connector body at one of its ends.

The jack 25 is mounted on the ribbon-type connector 22 by means of a cover such as a hood 61. The hood 61 includes sides 62—62 having inturned ribs 63—63 at an open end 64 thereof. The ribs 63—63 are designed to be received in grooves 66—66 along external side surfaces 67—67 of the jack. The end 64 of the hood 61 also includes a pair of opposed detents 68—68 which when the hood is mounted on the body 23 are designed to snap-lock under the overhangs 49—49 while engaging the ledges 48—48 (see FIG. 3).

At its opposite end, the hood 61 includes a nose 71 adapted to be secured to the front flange 41 of the body 23. The nose 71 is configured to mate with the flange 41 and includes a pair of tabs 72—72 that are adapted to be received in the undercuts 43—43 to hold the hood to the front flange 41. The nose 71 also includes an opening 74 through which a bolt 76 is adapted to extend to be threaded through the aperture 42 of the front flange 41.

Two occasions arise that mandate removal of the hood 61. First, in order to simplify the testing of the connector 21, the hood 61 and the jack 25 must be assembled to the body 23. Should a connector 21 be defective, the hood 61 must be removed to permit visual access. Secondly, should it be desired to change service to a customer, the hood 61 must be removed to allow an installer to rearrange the electrical connections from the jack to the contact elements 26—26.

Returning now to FIG. 1, there is shown the hand tool which is designated generally by the numeral 20 and which is used to remove the hood 61 from a connector body 23. The tool 20 may be molded from a relatively hard plastic material such as polycarbonate for example or may be made of metal.

The tool 20 includes an elongated body 101 which functions as a mounting means for a connector-supporting portion 102 and a hood-removal portion 103. The supporting portion 102 includes a pair of spaced rails 104—104 and a recessed bed 106. The body 23 of a connector 21 is adapted to be received between the rails 104—104 and supported in engagement with a surface of the bed 106. Further, one end 107 of the body 101 is formed to include a well 108 which opens to the bed 106. Since the connector 21 is supported on the tool 20 with the jack facing the removal portion 103, the well 108 is adapted to receive the bolt which extends below the front flange 41 of the body 23.

The connector supporting portion 102 also functions to align a connector 21 which is held thereon with the hood removal portion 103. The alignment is effected laterally as well as vertically above the bed 106.

It should be understood that this invention also includes a tool 20 without the connector-supporting portion 102. The connector 21 is held in one hand of a craftsperson with portions of the hood-removal portion 103 being effective to align the connector with the tool.

Figure 5:
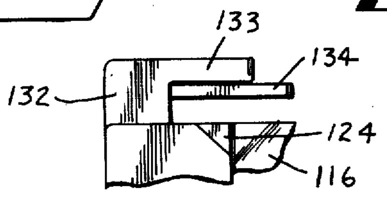
FIG. 5 is a side elevational view of a portion of the cover removal portion shown in FIG. 3.
Figure 6:
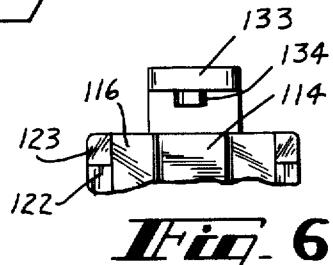
FIG. 6 is an end view of the portion of the removal portion shown in FIG. 5.

Turning now to the other end of the tool 20, the hood-removal portion 103 includes means for spreading apart the depending sidewalls of the hood 61 and for separating the hood from the ribbon-type connector 22 and the jack 25. The hood-removal portion includes an abutment 111 formed at the other end 112 of the body 101. The abutment 111 includes a portion 113 (see FIGS. 4–6) having a front face 114 which is normal to a longitudinal axis of the body 23 of a connector 21 mounted on the bed 106. The portion 114 has a width which is slightly less than the distance between the depending portions of the sidewalls. As can best be seen in FIGS. 1 and 4, the portion 113 is beveled to include two camming surfaces 116—116.

Figure 4:
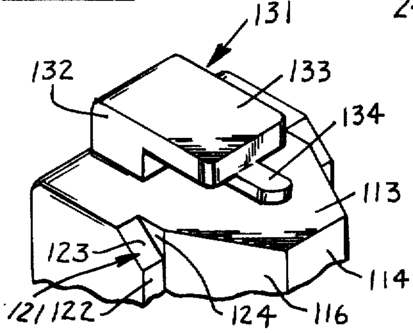
FIG. 4 is an enlarged perspective view of a removal portion of the tool of FIG. 1.

In a preferred embodiment, the portion 113 also includes a second camming portion 121 which functions as the separating means. As can be seen in FIG. 4, each of the side surfaces 116—116 terminates at a junction with a vertical extension 122 of the side rail. Further, each extension 122 is joined to a second camming surface 123 which abuts a surface 124 that is parallel to the axis of the connector.

The removal portion 103 is completed with a jack retainer 131 which is upstanding from the other end of the abutment 111. The retainer 131 includes a post portion 132 and a cantilevered portion or prong 133. The cantilevered portion 133 is sized to those dimensions of a modular plug which is receivable in the jack cavity 56.

In a preferred embodiment, the prong 133 includes a tab 134 that is attached to and that extends from an underside of the cantilevered portion 133. The tab 134 is sized to be received in that portion of the jack cavity 56 which normally receives the tab of a plug.

Figure 7:
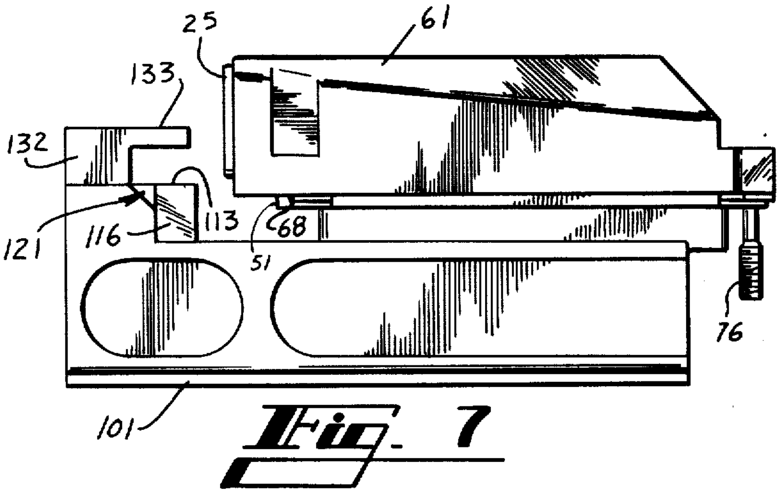
FIGS. 7 and 8 are a sequence of views showing the use of the tool to remove the cover.

In order to use the tool 20 to remove a hood 61, a connector 21 is positioned on the bed 106 with its sidewalls between the rails 104—104 with its nose end oriented away from the abutment 111 (see FIG. 7). It will be seen from the drawings that the jack cavity 56 is aligned with the prong 133 with the smaller portion of that cavity aligned with the tab 134. A depending portion of the bolt 76 of the connector 21 is received in the well 108. Moreover, when the connector 22 is supported on the bed 106 between the rails 104—104, the lower portion of the jack 25 on the rear flange of the connector is spaced above the top of the portion 113.

Figure 8:
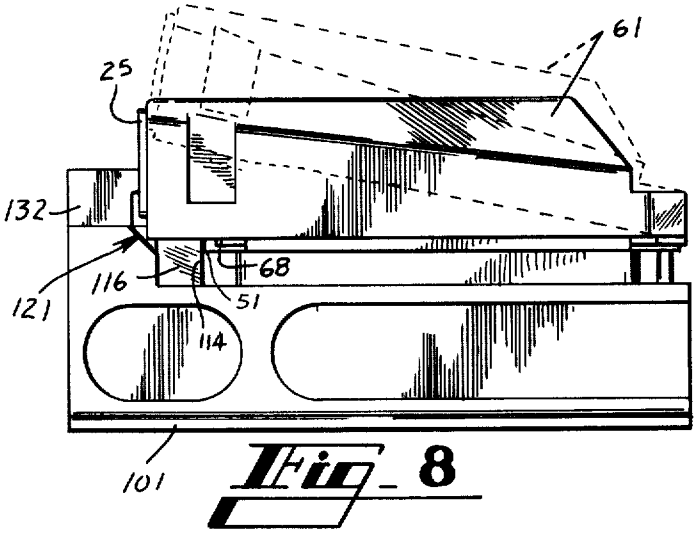

A craftsperson holds the tool 20 in one hand and with the other hand moves the connector 22 along the bed 106 toward the abutment 111. In a first increment of motion, the prong 133 and tab 134, which are aligned with the connector 21 on the bed 106, enter the jack cavity 56 and the depending sidewalls of the hood engage and ride along the camming surfaces 116—116 (see FIG. 8). This causes the hood sidewalls 62—62 to be spaced apart while the prong is effective to stabilize the connector 21.

Further movement along a second incremental distance results in a separation of the hood 61 from the ribbon-type connector 22 and from the jack 25. During the further motion, the spread apart sidewalls 62—62 engage and ride upwardly along the sloping surfaces 123—123. This causes forces to be applied to the sidewalls to cause the one end of the hood 61 to be moved pivotally outwardly from the connector 22 while its nose end 71 remains secured to the flange 41 of the connector. Advantageously, the prong 133 and tab 134 are effective to hold the jack 25 and the connector in engagement with the bed 106. Then the installer can easily complete the removal of the hood 61 from the front flange 41 of the connector 22.

The vertical, triangularly shaped parallel side surfaces 124—124 play an important role during the removal of the one end of the hood 61. Once the depending portions of the sidewalls are spaced apart by the camming surfaces 116—116, they ride along the surfaces 123—123. As they ride along the surfaces 123—123, the depending portions engage the portions 124—124 which insure that no further spreading ocurs.

The prong 133 and tab 134 are also important if the connector 21 were in one hand of the craftsperson thereby obviating the need for a supporting portion 102. In such an embodiment of this invention, the hood-removal portion 103 is held in the other hand of the craftsperson and moved into engagement with the connector. The initial insertion of the prong 133 and the tab 134 into the jack cavity 56 aligns the camming surfaces 116—116 with the depending portions of the hood 61.

Figure 9:
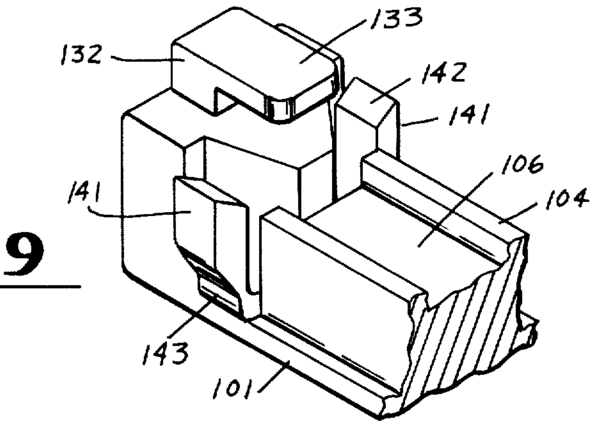
FIG. 9 is a perspective view of an alternative embodiment of the cover removal portion of the tool of this invention.

In an alternative embodiment which is shown in FIG. 9, the camming surfaces 123—123 are replaced with pivotally mounted cams 141—141. Each cam 141 includes a camming surface 142 which slopes inwardly downwardly toward the longitudinal axis of the bed 106. Each cam 141 is connected to the body 101 by a hinge 143.

In operation, the connector 21 is positioned on the bed 106 as before and moved through the first incremental distance. After the depending portions have been spread apart, their lowermost portions are cammed upwardly by the camming surfaces 142—142. The craftsperson depresses the cams 141—141 toward the abutment 113 causing the camming surfaces 142—142 to be moved in a slightly arcuate path to engage the depending portions and move the hood 61 pivotally upwardly.

Figure 10:
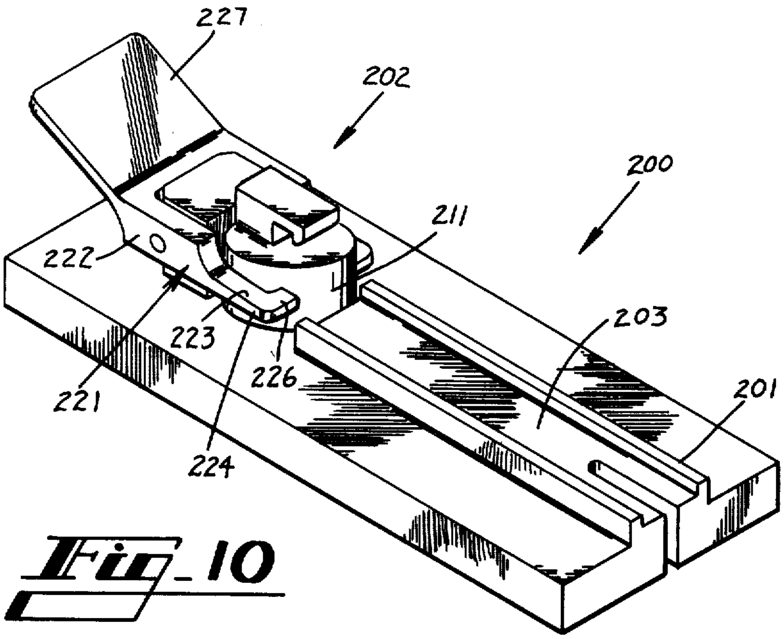
FIG. 10 is a perspective view of another alternative embodiment of this invention.

In another alternative embodiment, a tool 200 which is shown in FIG. 10 includes a connector-support means 201 and a hood-removal means 202. The connector support means includes a guideway 203 along which the connector 22 may be moved.

The hood-removal means 202 includes a cam 211 having an arcuately shaped peripheral surface. The overall width of the cam 211 is greater than the distance between the depending sidewalls 62—62 of the hood 61. As the connector 21 is moved along the guideway 203 through a first incremental distance, the cam 211 engages the sidewalls and spreads them apart.

The tool 200 also includes a portion 221 for separating the hood 61 from the connector 21 once the depending portions of the hood have been spread apart. The portion 221 includes a pivotally mounted beam 222 having a bifurcated portion 223. Each furcation 224 includes a hooked end portion 226 adapted to be aligned with one of the depending portions of the hood 61 in their separated positions.

After the sidewalls have been spread apart and the connector stabilized in engagement with the support means 201, the craftsperson depresses an opposite end 227 of the portion 221 to move the hooked-end portions 226—226 to engage the hood 61.

As soon as the lower edges of the depending portions of the sidewalls 62—62 clear the cam 211 the sidewalls return inwardly to their parallel orientation. Without the hooked end portions 226—226, the sidewalls in their returned orientation would not be aligned with the furcations 224—224 and further movement of the beam 222 would be ineffective in moving the hood 61 away from the connector 21. Continual movement of the beam 222 separates the hood 61 from the jack 25 and from the connector 22.

It is to be understood that the above-described arrangements are simply illustrative of the invention. Other arrangements may be devised by those skilled in the art which will embody the principles of the invention and fall within the spirit and scope thereof.

What I claim is:

1. A tool for removing a cover from an electrical connector to which it is secured by a locking arrangement between the connector and depending portions of sidewalls of the cover at one end of the connector, said tool comprising:

a prong which is adapted to be inserted into a cavity of the connector;

camming means aligned with the one end of the connector when said prong is inserted into the cavity for engaging the cover at the one end of the connector and for spreading apart the depending portions of the sidewalls of the cover to disengage the depending portions from the connector; and separating means rendered effective by the spreading apart of the depending portions of the cover for causing the cover to be moved away from the one end of the connector.

2. A tool for removing a cover from an electrical connector to which it is secured by a locking arrangement between a body of the connector and depending portions of sidewalls of the cover at one end of the connector, said tool comprising:

support means including means for holding the connector;

removing means mounted on said support means for moving the cover from its secured engagement with at least the one end of the connector, said support means being effective to permit relative motion between the connector on said support means and said removing means, said removing means including:

a prong which is adapted to be inserted into a cavity at the one end of the connector on said support means;

camming means aligned with the one end of the connector on said support means for engaging the cover at the one end of the connector for spreading apart the depending portions of the sidewalls of the cover to disengage the depending portions from the body of the connector; and separating means rendered effective by the spreading apart of the depending portions of the cover for causing the cover to be moved away from the one end of the connector with said prong being effective to hold the connector in engagement with said support means.

3. The tool of claim 2, wherein said camming means is a first camming means and said separating means comprises second camming means.

4. The tool of claim 3, wherein said support means is effective to permit relative motion through a first incremental distance to cause said first camming means to spread apart the depending portions of the sidewalls and then through a second incremental distance to cause said second camming means to separate the cover from the one end of the connector.

5. The tool of claim 3, wherein said support means is effective to permit relative motion through a first incremental distance to cause said first camming means to spread apart the depending portions of the cover and wherein said second camming means includes a pair of camming surfaces which are connected to said support means through hinge means, said second camming means being rendered effective upon movement of the connector through the first incremental distance to move the depending portions and the cover outwardly from the connector.

6. The tool of claim 2, wherein said support means includes a guideway along which the connector is capable of being moved slidably to engage said camming means.

7. A tool for removing a hood which covers a multicontact electrical connector and a modular jack at one end of the connector, the hood being secured to a body of the connector by detents which project from depending sidewalls at one end of the hood and which snaplock under ledges of the connector body, said tool comprising:

support means including means for holding the connector;

removing means mounted on said support means for moving the hood from secured engagement with the connector, said support means being effective to permit relative motion between the connector on said support means and said removing means, said removing means including:

a prong which is adapted to be inserted into a cavity of the jack at the one end of the connector on said support means; and camming means aligned with the one end of a connector on said support means for engaging the one end of the hood for spreading apart the depending portions of the hood to disengage the detents from the ledges and the jack from the hood and for then causing the hood to be moved out of engagement with the one end of the connector body and the jack.

8. A tool for removing a hood which covers a multi-contact electrical connector and a modular jack at one end of the connector, the hood being secured to a body of the connector by detents projecting inwardly from depending sidewalls at one end of the hood which snap-lock under ledges of the connector body, said tool including:

support means for holding said connector for slideable movement;

removing means for moving the hood from secured engagement with the connector, said removing means including:

a prong which is adapted to be inserted into the jack cavity of a connector on said support means;

camming means aligned with the connector on said support means for engaging the one end of the hood for spreading apart its sidewalls to disengage the detents from the connector and for releasing the jack from the hood; and separating means mounted pivotally and rendered effective upon the spreading apart of the sidewalls of the hood for moving the one end of the hood away from the connector to separate the hood from the connector; and means for mounting said support means and said removing means to permit a connector held on said support means to be moved into engagement with said removing means to cause said prong to enter the cavity of the jack of the connector and said camming means to spread apart the sidewalls of the hood.

9. The tool of claim 8, wherein said camming means includes an arcuate surface having a radius which is greater than one half the distance between the sidewalls of the hood from which the detents project.

10. The tool of claim 8, wherein said means for moving the one end of the hood outwardly includes a bifurcated member with the furcations thereof being disposed on opposite sides of said camming means.

11. The tool of claim 10, wherein said prong is effective to hold the jack after it has been released from engagement with the hood and to hold the connector in engagement with said support means while said separating means is moved to move the hood away from the one end of the connector.

* * * * *